(12) United States Patent
Bruss et al.

(10) Patent No.: US 8,056,963 B2
(45) Date of Patent: Nov. 15, 2011

(54) ROOF ASSEMBLY WINDSHIELD DEFOGGING SYSTEM

(75) Inventors: Paul Thomas Bruss, Cedar Falls, IA (US); Randy Charles Rush, Waterloo, IA (US)

(73) Assignee: Deere & Company, Moline, IL (US)

( * ) Notice: Subject to any disclaimer, the term of this patent is extended or adjusted under 35 U.S.C. 154(b) by 367 days.

(21) Appl. No.: 12/463,706

(22) Filed: May 11, 2009

(65) Prior Publication Data

US 2010/0283291 A1 Nov. 11, 2010

(51) Int. Cl.
*B60H 1/00* (2006.01)
(52) U.S. Cl. ............... 296/190.09; 296/208; 454/137
(58) Field of Classification Search .......... 296/190.09, 296/200, 208, 212; 454/136, 137
See application file for complete search history.

(56) References Cited

U.S. PATENT DOCUMENTS

| 4,223,754 A | 9/1980 | Mizuno et al. |
| 4,721,031 A | 1/1988 | Nakata et al. |
| 5,308,279 A | 5/1994 | Grinberg |
| 6,382,712 B1 | 5/2002 | Bruss |

*Primary Examiner* — Dennis Pedder
*Assistant Examiner* — Jason Daniels

(57) ABSTRACT

A vehicle roof assembly is coupled to a windshield. The roof assembly includes an outer roof member and an inner roof member which form a duct for conducting conditioned air therethrough. A body panel includes a front panel and a bottom panel which are integrally joined together at a corner. The corner has a plurality of apertures formed therein. An adhesive strip attaches an upper edge of the windshield to the front panel. The apertures receive conditioned air from the duct and form an airflow boundary layer which flows over an inner surface of the windshield. This assembly forms a windshield defogging system.

8 Claims, 2 Drawing Sheets

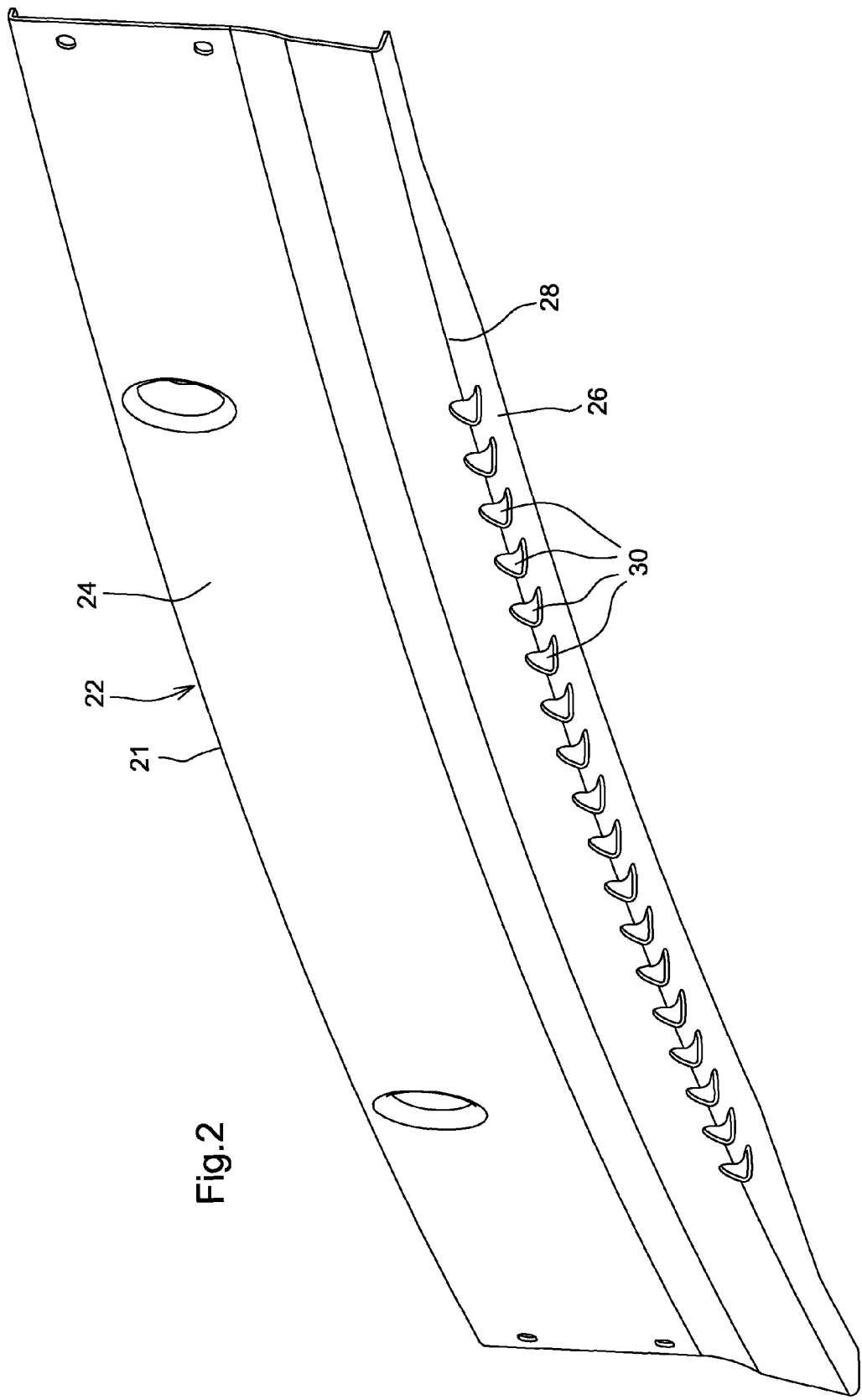

ROOF ASSEMBLY WINDSHIELD DEFOGGING SYSTEM

FIELD OF THE INVENTION

The present invention relates to a windshield defogging system for a vehicle with an HVAC system in the vehicle roof.

BACKGROUND OF THE INVENTION

All vehicles with enclosed cabs will at times have problems with the windshield fogging. This is caused by a natural build up of humidity from respiration which condenses on cold glass surfaces. Typically, this fog (which may also freeze) is removed from the windshield with air that has been conditioned to be dryer and warmer than the air in the cabin. In most applications, this air is delivered to the glass through a duct with louvered opening. Some current production tractors have HVAC units in the cab roof. In such tractors, the defogging air is directed downward and at the windshield at an angle. Because of this angle and because warm air tends to rise, the conditioned air can bounce off the windshield. This results in small cleared spots which then grow in size, and can result in the bottom portion of the windshield remaining fogged. It is desired to improve the speed and thoroughness of clearing the windshield of defog and/or frost.

SUMMARY OF THE INVENTION

Accordingly, an object of this invention is to provide a system for defogging a vehicle windshield.

This and other objects are achieved by the present invention, wherein a vehicle has a windshield attached to a roof assembly. The roof assembly encloses a duct or plenum for conducting conditioned air. The roof assembly includes comprises a body panel having a generally L-shaped cross sectional shape. The body panel includes a laterally and vertically extending front panel, and a laterally and horizontally extending bottom panel. The front and bottom panels are integrally joined together at a corner. The corner has a plurality of apertures formed therein. An adhesive strip attaches an upper edge of the windshield to the front panel. The plurality of apertures are positioned below the strip. The apertures receive conditioned air from the duct and form an airflow boundary layer which flows over an inner surface of the windshield. Such a surface airflow layer will flow along a wall and will cling to that wall rather than disperse into a volume. Such a surface airflow layer of conditioned air will tend to better clear the glass if it stays on the glass.

BRIEF DESCRIPTION OF THE DRAWINGS

FIG. 2 is a perspective view of the panel member of FIG. 1.

DESCRIPTION OF THE PREFERRED EMBODIMENT

Figure 1:
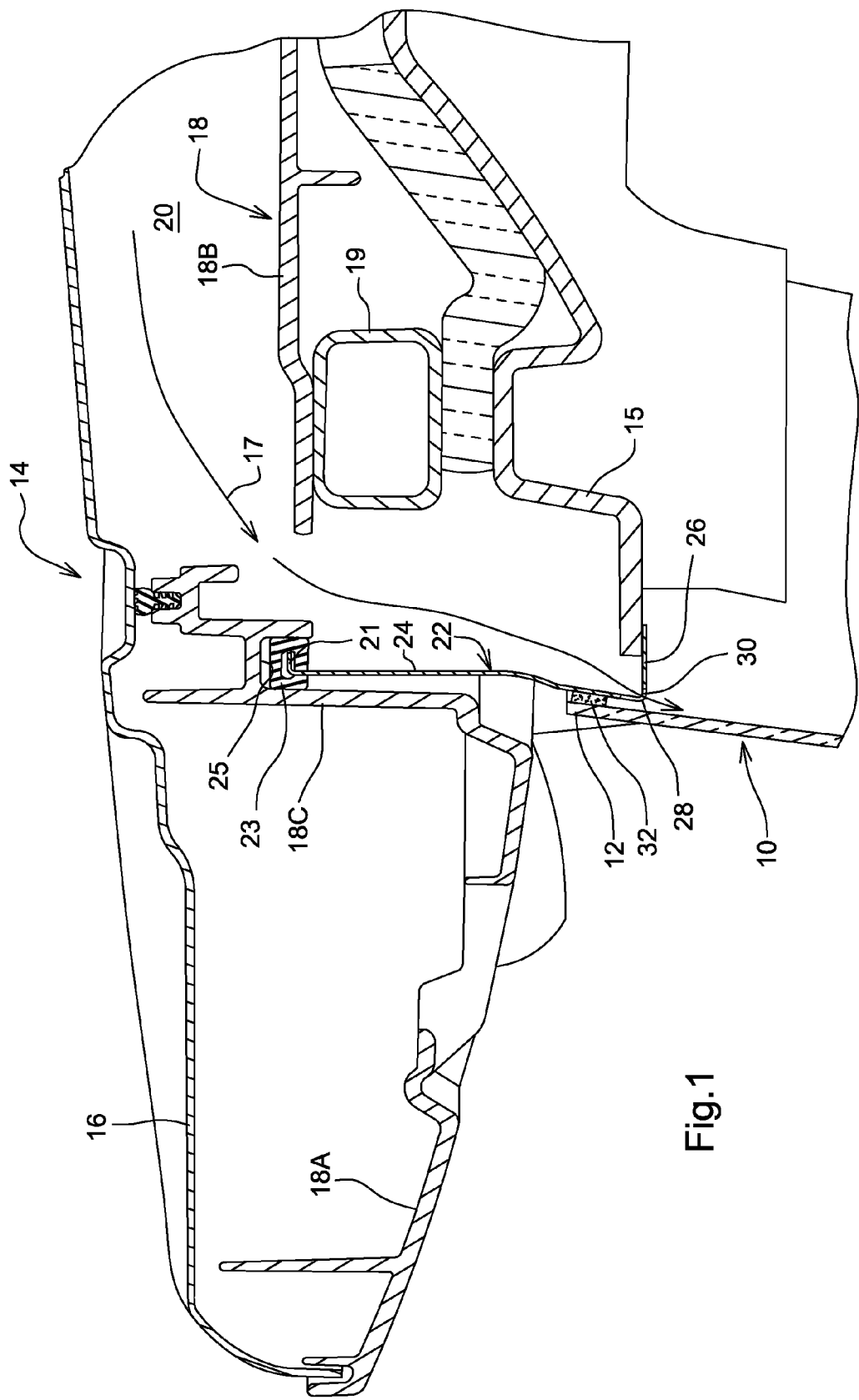
FIG. 1 is a sectional view of a portion of a vehicle roof assembly, including the portion which is joined to a windshield of the vehicle.

Referring to FIGS. 1 and 2, an upper edge 12 of a vehicle windshield 10 is attached to a roof assembly 14. The roof assembly 14 includes a headliner 15, an outer roof 16, an inner roof 18 and a tubular frame member 19. Inner roof 18 has an outer or overhanging portion 18A, an inner portion 18B and a wall portion 18C arranged therebetween. Outer roof 16 and inner roof inner portion 18B enclose a duct or plenum 20 through which flows conditioned air. Conditioned air then flows though a gap 17 in the inner portion 18B towards an upper portion of the windshield 10. The pressurized plenum 20 is sealed to avoid loss of pressure everywhere except where air is desired to flow.

According to the present invention, the roof assembly 14 also includes a glass mounting panel 22 which has a generally L-shaped cross sectional shape. The panel 22 includes a laterally and vertically extending front panel member 24, and a laterally and horizontally extending bottom panel member 26. The front and bottom panels 24 and 26 are integrally joined together at a corner 28. A plurality of apertures 30 are formed in the corner 28. An edge of the bottom panel member 26 is fixed to a front edge of the headliner 15. An adhesive strip 32 attaches an upper edge of the windshield 10 to a lower portion of the front panel member 24 close to, but above the apertures 30 and the corner 28. An upper edge 21 of the panel 22 is received within a seal 23 which is held in a groove 25 formed by the inner roof wall portion 18C.

The apertures 30 form a defog outlet in the panel member 22 to which the windshield 10 is adhered. The apertures 30 are cut into the bend or corner 28 in the panel 22 so that the pressurized air flows directly against the windshield 10. With this defog system, a large area of the windshield 10 is covered by flowing air. As a result, conditioned air flows from duct 20 through gap 17 and through apertures 30 and then downward along the inside surface of the windshield 10. This flow of air forms an airflow boundary layer which flows over an inner surface of the windshield 10 and which sticks to the glass until that surface is disrupted. Thus, the windshield is effectively and efficiently cleared by this roof assembly defogging system.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a vehicle having a windshield attached to a roof assembly, the roof assembly enclosing a duct for conducting conditioned air, the improvement wherein:
   the roof assembly comprises a body panel having a generally L-shaped cross sectional shape, the body panel comprising a laterally and vertically extending front panel, a laterally and horizontally extending bottom panel, the front and bottom panels being integrally joined together at a corner, the corner having a plurality of apertures formed therein; and
   an adhesive strip attaching an upper edge of the windshield to the front panel, the plurality of apertures being positioned below the strip, the apertures receiving conditioned air from the duct and forming an airflow boundary layer which flows over an inner surface of the windshield.

2. The roof assembly of claim 1, wherein:
   the roof assembly comprises an outer roof member and an inner roof member, the inner roof member forming a gap, conditioned air flowing from the duct through the gap and to the plurality of apertures.

3. The roof assembly of claim 1, wherein:
   the roof assembly comprises a headliner, an edge of the body panel being attached to the headliner.

4. The roof assembly of claim 1, wherein:
   the roof assembly comprises a headliner, an edge of the bottom panel being attached to the headliner.

5. A vehicle roof assembly coupled to a windshield, the roof assembly comprising:
- an outer roof member and an inner roof member forming a duct for conducting conditioned air therethrough;
- a body panel comprising a laterally and vertically extending front panel and a laterally and horizontally extending bottom panel, the front and bottom panels being integrally joined together at a corner, the corner having a plurality of apertures formed therein; and
- an adhesive strip attaching an upper edge of the windshield to the front panel, the plurality of apertures being positioned below the strip, the apertures receiving conditioned air from the duct and forming an airflow boundary layer which flows over an inner surface of the windshield.

6. The roof assembly of claim 5, wherein:

the inner roof member forms a gap, conditioned air flowing from the duct through the gap and to the plurality of apertures.

7. The roof assembly of claim 5, wherein:

the roof assembly comprises a headliner, an edge of the body panel being attached to the headliner.

8. The roof assembly of claim 5, wherein:

the roof assembly comprises a headliner, an edge of the bottom panel being attached to the headliner.

* * * * *